(12) United States Patent
John Archibald et al.

(10) Patent No.: US 9,602,349 B2
(45) Date of Patent: Mar. 21, 2017

(54) MULTI-DEVICE SENSOR SUBSYSTEM JOINT OPTIMIZATION

(71) Applicant: QUALCOMM Incorporated, San Diego, CA (US)

(72) Inventors: Fitzgerald John Archibald, Toronto (CA); Khosro Mohammad Rabii, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 283 days.

(21) Appl. No.: 14/461,984

(22) Filed: Aug. 18, 2014

(65) Prior Publication Data

US 2016/0050114 A1  Feb. 18, 2016

(51) Int. Cl.
| | |
|---|---|
| H04W 52/02 | (2009.01) |
| H04L 12/24 | (2006.01) |
| H04L 29/08 | (2006.01) |
| G06F 1/32 | (2006.01) |
| H04L 12/403 | (2006.01) |

(52) U.S. Cl.
CPC ........ *H04L 41/0823* (2013.01); *G06F 1/3206* (2013.01); *G06F 1/3234* (2013.01); *H04L 12/403* (2013.01); *H04L 41/12* (2013.01); *H04L 67/12* (2013.01); *H04W 52/0212* (2013.01); *H04W 52/0261* (2013.01)

(58) Field of Classification Search
CPC ... H04L 41/0823; H04L 12/403; H04L 67/12; H04L 41/12; H04W 52/0212; H04W 52/0261; G06F 1/3206; G06F 1/3234
See application file for complete search history.

(56) References Cited

U.S. PATENT DOCUMENTS

| | | | |
|---|---|---|---|
| 7,911,338 B2 | 3/2011 | Naeve et al. | |
| 8,060,018 B2 | 11/2011 | Davis et al. | |
| 8,325,995 B1 | 12/2012 | Bowers et al. | |
| 8,558,660 B2 | 10/2013 | Nix et al. | |
| 9,374,768 B2 * | 6/2016 | Wang .................... | H04W 48/12 |
| 2011/0098001 A1 | 4/2011 | Elsom-Cook et al. | |
| 2012/0004782 A1 | 1/2012 | Koskan et al. | |
| 2013/0316696 A1 | 11/2013 | Huang et al. | |
| 2014/0115372 A1 | 4/2014 | Myrberg et al. | |

(Continued)

FOREIGN PATENT DOCUMENTS

| | | |
|---|---|---|
| WO | WO-03015452 A2 | 2/2003 |
| WO | WO-2006038163 A1 | 4/2006 |

OTHER PUBLICATIONS

International Search Report and Written Opinion—PCT/US2015/040948—ISA/EPO—Oct. 1, 2015.

*Primary Examiner* — Phuc Tran
(74) *Attorney, Agent, or Firm* — Kilpatrick Townsend & Stockton LLP

(57) ABSTRACT

A system and method for reducing sensor redundancy in sensor-equipped devices includes identifying, via a master device, at least one device within an area. The at least one device is queried to determine at least one of a device status or application status for the at least one device. A configuration of one or more sensors within the at least one device based at least in part on the querying is determined. The one or more sensors within the at least one device is configured to balance quality of service across the master device and the at least one device, based at least in part on the determining.

30 Claims, 9 Drawing Sheets

(56) References Cited

U.S. PATENT DOCUMENTS

| | | | | |
|---|---|---|---|---|
| 2014/0192643 A1* | 7/2014 | Kalapatapu | ........... | H04W 48/00 370/230 |
| 2015/0156605 A1* | 6/2015 | Skaaksrud | ............ | H04W 12/06 455/456.1 |
| 2015/0289185 A1* | 10/2015 | Kalapatapu | ........... | H04W 36/22 370/230 |

* cited by examiner

MULTI-DEVICE SENSOR SUBSYSTEM JOINT OPTIMIZATION

BACKGROUND

The present disclosure relate generally to sensor-equipped devices, and more particularly, to methods and apparatuses for reducing and/or managing sensor redundancy in sensor-equipped devices.

Devices today include many sensors that are common across devices. For instance, sensors such as GPS, accelerometer, camera, microphone, etc. are typically present in multiple device types including, cell phones, tablet computers, smart glass, smart watch, smart shoes, etc. Often times, only a single sensor from an individual device is needed to obtain a measurement (e.g., GPS coordinates). The redundancy of other GPS sensors in the other devices results in a waste of power and underperformance of each device. Accordingly, a need exists to optimize these various devices in the vicinity of a person to operate harmoniously by their sensors working in unison.

BRIEF SUMMARY

In some implementations, a method for reducing sensor redundancy in sensor-equipped devices includes identifying, via a master device, at least one device within an area. The method also includes querying, via the master device, the at least one device to determine at least one of a device status or application status for the at least one device. The method additionally includes determining, via the master device, a configuration of one or more sensors within the at least one device based at least in part on the querying. The method further includes based at least in part on the determining, configuring, via the master device, the one or more sensors within the at least one device to balance quality of service across the master device and the at least one device.

In some implementations, the at least one device comprises a smartphone, a tablet computer, a smart shoe, a smart watch, television, personal computer, or a smart glass.

In some implementations, configuring the one or more sensors comprises switching a power state of the one or more sensors within the at least one device.

In some implementations, the one or more data processing attributes comprises at least one of datapath, data accuracy, data format, or data interval.

In some implementations, the area may be determined by at least one of a predetermined value, a dynamic value, or a determined context associated with the at least one device.

In some implementations, the determining comprises determining a sensor implementation mapping of the at least one device.

In some implementations, the method additionally includes time-synchronizing, via the master device, data from the one or more sensors within the at least one device with data from one or more sensors within the master device.

In some implementations, the configuring is performed upon a predetermined interval or upon a predefined condition.

In some implementations, the method also includes receiving, at the master device, a location request, polling, via the master device, the or more sensors within the at least one device, in response to the polling, receiving, from the at least one device, a location of the at least one device, and responding, via the master device, to the location request with the location of the at least one device.

In some implementations, an apparatus for reducing sensor redundancy in sensor-equipped devices includes a transceiver configured to send and receive a communication, memory, and a processor coupled to the transceiver and the memory. The processor is configured to identify at least one device within an area, query, via the transceiver, the at least one device to determine at least one of a device status or application status for the at least one device, determine a configuration of one or more sensors within the at least one device based at least in part on the querying, and based at least in part on the determining, configure the one or more sensors within the at least one device to balance quality of service across the apparatus and the at least one device.

In some implementations, an apparatus for reducing sensor redundancy in sensor-equipped devices includes means for identifying, via a master device, at least one device within an area. The apparatus also includes means for querying, via the master device, the at least one device to determine at least one of a device status or application status for the at least one device. The apparatus additionally includes means for determining, via the master device, a configuration of one or more sensors within the at least one device based at least in part on the querying. The apparatus further includes, based at least in part on the determining, means for configuring, via the master device, the one or more sensors within the at least one device to balance quality of service across the master device and the at least one device.

In some implementations, a processor-readable non-transitory medium comprising processor readable instructions is configured to cause a processor to identify at least one device within an area, query the at least one device to determine at least one of a device status or application status for the at least one device, determine a configuration of one or more sensors within the at least one device based at least in part on the querying, and based at least in part on the determining, configure the one or more sensors within the at least one device to balance quality of service across a master device and the at least one device.

BRIEF DESCRIPTION OF THE DRAWINGS

An understanding of the nature and advantages of various implementations may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
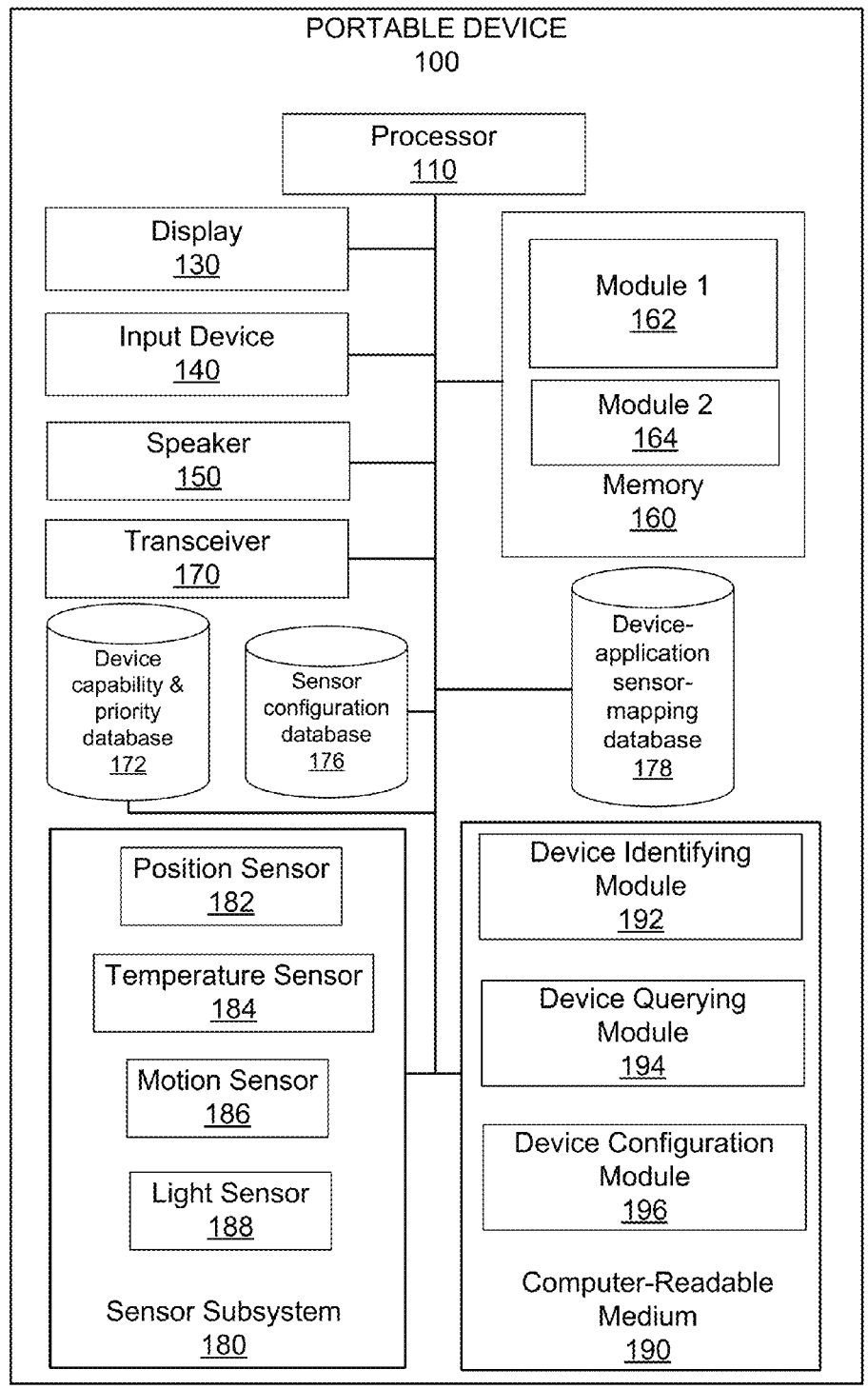
FIG. 1 illustrates a simplified block diagram of a portable device 100 that may incorporate one or more implementations.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several illustrative implementations will now be described with respect to the accompanying drawings, which form a part hereof. While particular implementations, in which one or more aspects of the disclosure may be implemented, are described below, other implementations may be used and various modifications may be made without departing from the scope of the disclosure or the spirit of the appended claims.

Several aspects of sensor-equipped devices will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary implementations, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Implementations described herein include identifying one or more devices within a predefined vicinity of a user. The identification of the devices could be based on learning which devices are within the vicinity using various sensors available to the device(s). One device may assume the master role based on a predefined master priority or based on a current state (e.g., battery life remaining, computing availability, etc.) of the device. The master device may poll the various other devices for their device state (e.g., sensor states, application states, etc.) From polling the various other devices, the master device may identify the configuration of active sensors across the devices, data routing paths, communication methods, update intervals, etc. The master device may then acquire control/sharing of the sensors across the other devices. The master may turn sensors within the other devices on, off, or configure sensors based on necessity, battery capacity/level, system load, usage patterns, accuracy, etc. The data obtained from the sensors of other devices may be time synchronized for uniformity of input data and for switching the communication window for optimal power/performance. Upon certain conditions or predefined intervals, the sensor data path is reassessed to determine whether any changes should be implemented.

Many implementations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Portable Device Including a Capacitive Touch Panel

FIG. 1 illustrates a simplified block diagram of a portable device 100 that may incorporate one or more implementations. Portable device 100 includes a processor 110, display 130, input device 140, speaker 150, memory 160, transceiver 170, device capability and priority database 172, sensor configuration database 176, device-application sensor-mapping database 178, sensor subsystem 180, and computer-readable medium 190.

Processor 110 may be any general-purpose processor operable to carry out instructions on the portable device 100. The processor 110 is coupled to other units of the portable device 100 including display 130, input device 140, speaker 150, transceiver 170, sensor subsystem 180, and computer-readable medium 190.

Display 130 may be any device that displays information to a user. Examples may include an LCD screen, CRT monitor, or seven-segment display.

Input device 140 may be any device that accepts input from a user. Examples may include a keyboard, keypad, mouse, or touch input.

Speaker 150 may be any device that outputs sound to a user. Examples may include a built-in speaker or any other device that produces sound in response to an electrical audio signal.

Memory 160 may be any magnetic, electronic, or optical memory. Memory 160 includes two memory modules, module 1 162 and module 2 164. It can be appreciated that memory 160 may include any number of memory modules. An example of memory 160 may be dynamic random access memory (DRAM).

Transceiver 170 may be any transmitter/receiver configured to send and receive wireless signals. The transceiver 170 may be operable to send and receive the wireless signals in a format specified by a wireless specification, e.g. Wi-Fi or Bluetooth. In some implementations, transceiver 170 may be used for identifying, querying, and/or polling devices within an area.

Sensor subsystem 180 includes position sensor 182, temperature sensor 184, motion sensor 186, and light sensor 188. It can be appreciated the sensors illustrated in FIG. 1 are merely exemplary and that the sensor subsystem 180 may include any number of sensors, including sensor types not depicted in the figure. The sensor subsystem 180 may be configured to facilitate access between any of the sensors and any of the components of the portable device 100, e.g., processor 110. The position sensor 182 may be configured to obtain a position measurement of the portable device 100. The position sensor 182 may be a linear, angular, or multi-axis position sensor. In some implementations, the position sensor 182 may be a GPS device. The temperature sensor 184 may be configured to obtain an ambient temperature measurement of the surroundings that the portable device 100 is currently located within. For example, the temperature sensor 185 may obtain a temperature measurement within an office building if the portable device 100 is located within the office building. Motion sensor 186 may be configured to determine motion and/or orientation of the portable device 100. The motion sensor 186 may be an accelerometer, or a series of accelerometers. The light sensor 188 may be configured to measure an amount of ambient light within surroundings that the portable device 100 is currently located within. The light sensor 188 may detect light or brightness in a similar way as the human eye. The light sensor 188 may be a specific version of a photodiode, capable of converting light into a voltage or current. The light sensor 188 may have a typical spectral response ranging from 350 nm to 1100 nm. As such, the light sensor 188 can detect the amount of ambient light of an environment in which the portable device 100 is present.

Computer-readable medium 190 may be any magnetic, electronic, optical, or other computer-readable storage medium. Computer-readable medium 190 may include one or more software modules executable by processor 110. These software modules may include device identifying module 192, device querying module 194, and device configuration module 196.

Device identifying module 192 may be configured to identify one or more devices within an area proximate to the portable device 100. The one or more devices may include, but is not limited to, smartphones, tablets, smart watches, smart shoes, smart glasses, etc. The device identifying module 192 may interface with the transceiver 170 to send a communication to the other devices or broadcast a communication to detect their presence. For example, the device identifying module 192 may interface with transceiver 170 to broadcast a detection message which other devices proximate to the portable device 100 may respond to. The broad message may be formulated and sent according to a communication protocol, e.g., Wi-Fi or Bluetooth.

Device querying module 194 may be configured to query the one or more devices identified, by the device identifying module 192, within an area proximate to the portable device 100. The device querying module 194 may interface with transceiver 170 to query the one or more devices. Upon querying the one or more devices, the device querying module 194 may determine a sensor status and/or application status for the one or more identified devices. For example, the device querying module 194 may determine which types of sensors exist on the one or more devices, the current state of the sensors, which applications exist on the one or more devices, and the current state of the applications.

Device configuration module 196 may be configured to determine the configuration of active sensors, data routing paths, communication methods, update intervals, etc. of the one or more identified devices. Upon determining the various configurations of the one or more devices, the device configuration module 196 may configure the applications and/or sensors of the one or more devices. For example, the device configuration module 196 may instruct a device, via a message sent using transceiver 170, to power down its GPS sensor.

The device capability & priority database is configured to store information pertaining to the one or more identified devices. The information may include device name, device manufacturer, device identifier, and device capabilities. The device capability & priority database may also store information pertaining to a priority of each device. Each device may be ranked in order of priority, with sensors of higher priority devices given precedence. The device identifying module 192 and device querying module 194 may populate the device capability & priority database 172 in real-time upon performing the identifying and querying steps described above.

The sensor configuration database 176 may store information pertaining configuration of various sensors in the one or more identified devices. The sensor configuration database 176 may include information about sensor type, sensor power, sensor bandwidth, sensor data type, etc. The device configuration module 196 may populate the sensor configuration database 176 in real-time upon performing the configuration determination steps described above.

The device-application sensor-mapping database 178 may store information pertaining to the mapping between one or more applications and one or more sensors within the one or more identified devices. The mapping information may include information about which sensors within the one or more devices can be used by applications running on the portable device 100. The device configuration module 196 may populate the device-application sensor-mapping database 178 in real-time upon performing the configuration determination steps described above.

Figure 2A:
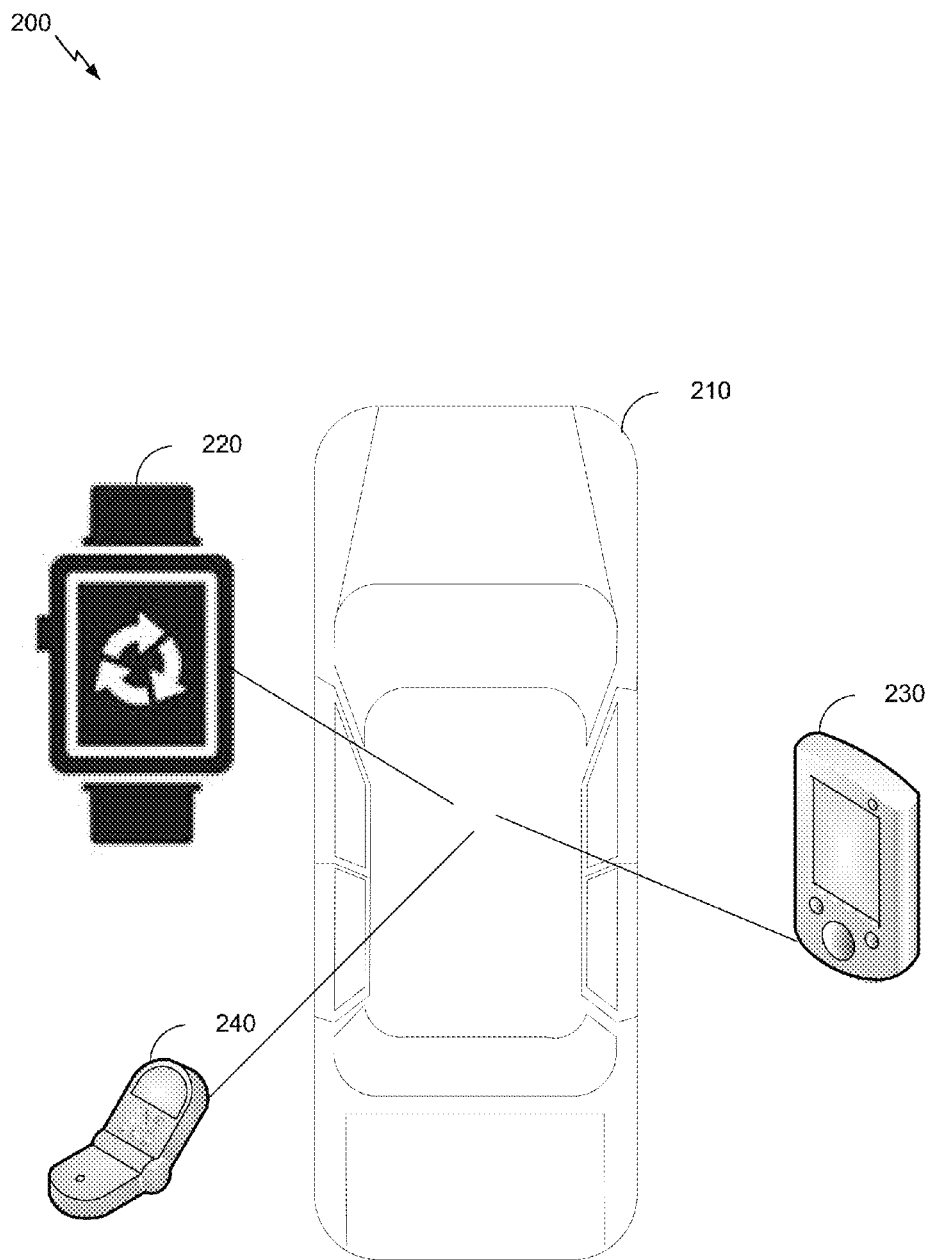
FIG. 2A illustrates a plurality of sensor-equipped devices within an environment 200, according to some implementations.

FIG. 2A illustrates a plurality of sensor-equipped devices within an environment 200, according to some implementations. The environment 200 includes a vehicle 210, a smart watch 220, a tablet computer 230, and a smartphone 240. The smart watch 220, tablet computer 230, and smartphone 240 may be located within the vehicle 210. For example, a user may be driving the vehicle 210 while taking the devices along with him/her for the journey. Each of the devices may include one or more sensors. For example, the smart watch could include a GPS sensor, an accelerometer, and a blood pressure sensor. The tablet computer 230 could include a GPS sensor, a light sensor, and a fingerprint sensor. The smartphone 240 could include a GPS sensor, a light sensor, and a temperature sensor. As illustrated, in this example, each device includes a GPS sensor, and the smartphone 240 and tablet computer 230 also both include a light sensor. Also illustrated, in this example, the smart watch does not include a light sensor or a temperature sensor; the tablet computer 230 does not include an accelerometer, a blood pressure sensor, or a temperature sensor; and the smartphone 240 does not include an accelerometer, blood pressure sensor, and fingerprint sensor. However, the systems and method described herein may reduce sensor redundancy between the devices and also leverage specific sensors of specific devices for use with other devices not equipped with those specific sensors.

As illustrated in FIG. 2, for example, since each device contains a GPS sensor, it may be redundant to have all three GPS sensors powered on and may potentially cause underperformance of each device. It can be appreciated that one of the devices illustrated in FIG. 2 may carry out the functions of portable device 100 described with respect to FIG. 1. This device may function as a "master device" to implement the systems and methods described herein. For illustrative purposes, the smartphone 240 may be the master device. The selection of which device will act as the master device may be based on a pre-defined master priority or on a current state of the devices. The current state may include remaining battery life, processing power, etc.

The smartphone 240 may identify, via device identifying module 192 (FIG. 1), one or more other devices in an area proximate to the smartphone 240. In this example, the area proximate to the smartphone 240 may include the area within the vehicle 210. As such, the smartphone 240 may identify the smart watch 220 and the tablet computer 230. It can be appreciated that the area proximate to the smartphone 240 may also include devices determined to be on the user, devices within a predetermined distance, or any other defined area.

The identification of the devices within an area proximate to the smartphone 240 may be performed via the device identifying module 192 (FIG. 1) using a communication standard such as Wi-Fi or Bluetooth. The smartphone 240 may broadcast a communication, via device identifying module 192 (FIG. 1), to which devices proximate to the smartphone 240 may respond. For example, the smart watch 220 and the tablet computer 230 may respond to a broadcast communication by the smartphone 240. The smartphone 240, via device identifying module 192 (FIG. 1), may determine which devices are within the proximate area based on the received responses. The smartphone may then update the device capability & priority database 172 (FIG. 1) with information about the identified devices.

Upon determining which devices are within an area proximate to the smartphone 240, the smartphone 240 may, via device querying module 194 (FIG. 1), query each of the identified devices to determine a state of each device. The state of each device may include sensor states, application states, etc. Each device may respond to the query request with information about its current state. For example, the smartphone 240 may poll the smart watch 220 and the tablet computer 230 to determine a current state of the devices. The smart watch 220 and tablet computer 230 may respond to the smartphone 240 with a current sensor(s) state and application(s) state. Once again, these communications may follow a communication protocol, e.g., Wi-Fi or Bluetooth. It can be appreciated that if one of the devices is asleep at the time of querying, that device may be woken up to respond to the query request. In some implementations, the sensor states and application states of the one or more devices may be pre-configured based on the capabilities of the device(s).

Upon querying each of the identified devices to determine a state of each device, the smartphone 240 may identify the configuration of active sensors, data routing paths, data control paths, data processing unit information, data format, communications methods, update intervals, etc. on the one or more identified devices. The identification may be performed by the device configuration module 196 (FIG. 1), as described above. Additionally, the device configuration module 196 (FIG. 1) may determine a required active state of the one or more sensors in the one or more identified devices. The determination for the required state may be based on necessity, battery capacity, battery remaining, system load, usage patterns, accuracy, etc. For example, the smartphone 240 may identify the configuration of the sensors of the tablet computer 230 and the smart watch 220.

Upon identifying the configuration of the active sensors, the smartphone 240 may configure the one or more sensors in the one or more identified devices based on the determination above. The sensors in each of the one or more identified devices may perform he tasks defined by the smartphone 240. At this point, the smartphone 240 may cease its role as the "master device." For example, the smartphone 240 may configure the sensors within the tablet computer 230 and the smart watch 220. The various sensors across the smartphone 240, tablet computer 230, and the smart watch 220 may then work together and share data.

The system and method described above may be further understood as applied to the environment 200 depicted in FIG. 2. As described above, the various devices in the environment 200 have redundant sensors. For example, the smart watch 220, tablet computer 230, and smartphone 240 all have GPS sensors. In some implementations, the vehicle 210 in the environment 200 may also be a "smart" vehicle including the capability to function as a "master" device, as described above. The "smart" vehicle 210 may comprise elements similar to those described with respect to portable device 100 in FIG. 1. As mentioned earlier, the smart watch 220, tablet computer 230, and smartphone 240 may all be located within the vehicle 210. In some implementations, the devices may pair themselves to each other using an inter-device communication protocol. That is, the vehicle 210, smart watch 220, tablet computer 230, and smartphone 240 may communicate amongst each other. In this particular example, the vehicle 210 may identify itself as the "master device" based on its battery capacity, processing capacity, or sensory capabilities. For example, if the vehicle 210 determines that it has the fastest processor of the devices and/or the high battery life of the devices, the vehicle may declare itself the "master device". The vehicle 210, if functioning as the "master device", may identify the smart watch 220, tablet computer 230, and smartphone 240 as being present within the vehicle 210, or near the vehicle 210.

The vehicle 210 may then query the smart watch 220, tablet computer 230, and smartphone 240 to determine their device states. The device states may include, but is not limited to, sensor configuration, application state, and power/processing capacity. Upon learning the device states of the smart watch 220, tablet computer 230, and the smartphone 240, the vehicle 210 may determine that there is GPS sensor redundancy across the various devices. That is, the vehicle 210 may determine that the smart watch 220, tablet computer 230, and the smartphone 240 all include a GPS sensor. It may be inefficient to leave all the GPS sensors across the various devices active as it may harm battery life and result in underperformance of the devices. Typically, when a vehicle is travelling, only one GPS sensor could be needed. The vehicle 210 may determine which GPS sensor across the various devices to use. This determination may be based on accuracy and/or signal strength of the GPS sensor, resource level (e.g., battery level, CPU power, etc.) of the various devices, and latency requirements for an application that may use the GPS sensor (e.g., a navigation application running on the vehicle 210). For example, the vehicle 210 may determine to use the GPS sensor located within the smartphone 240.

At this point, the vehicle 210 may elect to power off the GPS sensors in the smart watch 220 and the tablet computer 230, as they may be redundant and data from them may not be needed to navigate. The vehicle 210 may accomplish this by sending a communication to the smart watch 220 and tablet computer 230 instructing them to turn off their GPS sensor. The vehicle 210 may then establish a connection with the smartphone 240. Establishing the connection may include configuring the GPS sensor on the smartphone 240 by setting its update interval, accuracy, data bandwidth, etc. The configuration of these attributes may be device specific. Further, establishing the connection may include selecting a data format and time synchronizing the data communications between the vehicle 210 and the smartphone 240. The vehicle 210 may then receive data from the GPS sensor of the smartphone 240 via the agreed upon communication format. In some implementations, the vehicle 210 may periodically send the received GPS data to the smart watch 220 and tablet computer 230.

Upon disassociation of the vehicle 210 and the GPS sensor within the smartphone 240, the GPS sensors within the smart watch 220 and the tablet computer 230 may become activated. The GPS sensors may become activated automatically or upon receiving a communication from the vehicle 210 upon the vehicle's 210 disassociation with the GPS sensor within the smartphone 240.

In another example, the systems and methods described herein can be applied to network data connectivity. For example, the smartphone 240 and the tablet computer 230 may both include communication sensors (e.g., Wi-Fi and 3G/4G modules). In an example, the smartphone 240 may assume the "master role" based on certain criteria. The criteria may include usage, e.g., if the user is not currently using the tablet computer 230. The criteria may also include capabilities of the tablet computer 230, e.g., tablet computer only supports 3G connectivity while smartphone 240 supports 4G connectivity. Accordingly, the smartphone 240 may instruct the tablet computer 230 to power off its Wi-Fi and 3G/4G modules and the smartphone 240 may establish a data sharing communication with the tablet computer 230, e.g., using Bluetooth. Other conditions where the smartphone 240 may assume the "master role" may include when a connectivity signal is absent on the tablet computer 230 or when applications on the tablet computer 230 do not require connectivity.

It can be appreciated that systems and methods described with respect to FIG. 2A may result in increase computing performance, increased battery life, better quality of service, and uniform data access across the various devices.

Figure 2B:
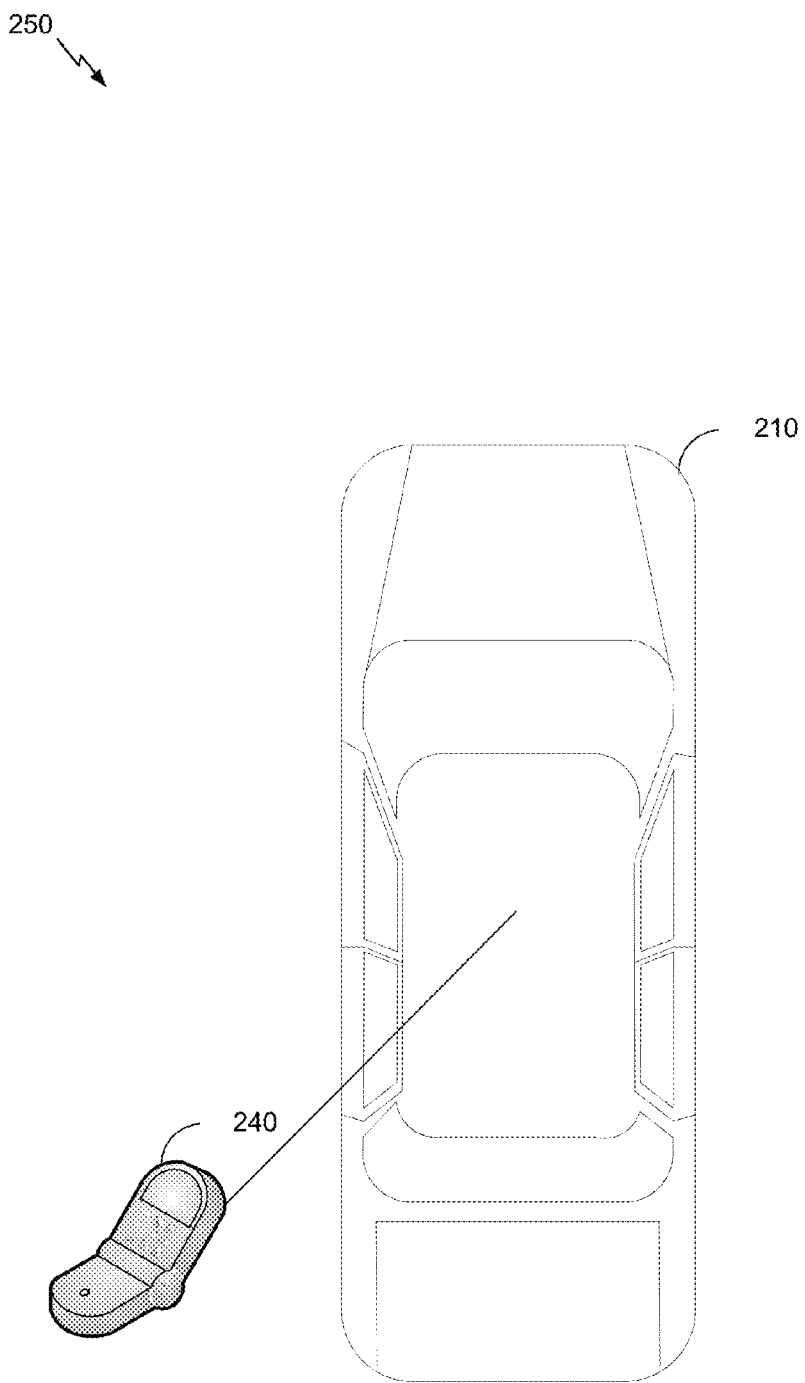
FIG. 2B illustrates a sensor-equipped smartphone 240 within an environment 250, according to some implementations.

FIG. 2B illustrates a sensor-equipped smartphone 240 within an environment 250, according to some implementations. The environment 250 includes a vehicle 210 and a smartphone 240. The smartphone 240 may be located within the vehicle 210. For example, a user may be driving the vehicle 210 while taking the smartphone 240 along with him/her for the journey. The smartphone 240 may include one or more sensors. Further, both the smartphone 240 and the vehicle 210 may be equipped with a natural user interface (e.g., speech recognition and gesture recognition systems). The vehicle 210 may query the smartphone 240 and also identify itself as the "master device", similar to the sequence described with respect to FIG. 2A. The vehicle 210 may then identify that the smartphone 240 also has a natural interface and thus natural interface redundancy exists. The vehicle 210 may instruct the smartphone 240 to power off certain sensors associated with the natural user interface on the smartphone 240. For example, these sensors may include, but is not limited to, cameras, microphones, and touch controllers. Similar sensors to those turned off, located within the vehicle 210 may be used to carry out the functions of the natural user interface.

Further, the natural user interface may be integrated to the vehicle's 210 interface. For example, the user may speak the word "phone" or perform a specific gesture to route the user's inputs to smartphone 240. In some implementations, the smartphone 240 may reactive the turned off sensors based on events such as a manual override (e.g., user input to the vehicle 210), loss of vicinity (e.g., user leaves the vehicle 210), or change of actions or activities (e.g., user stops driving the vehicle 210).

It can be appreciated that systems and methods described with respect to FIG. 2B may result in increase computing performance, increased battery life, better quality of service, and uniform data access across the various devices.

Figure 3:
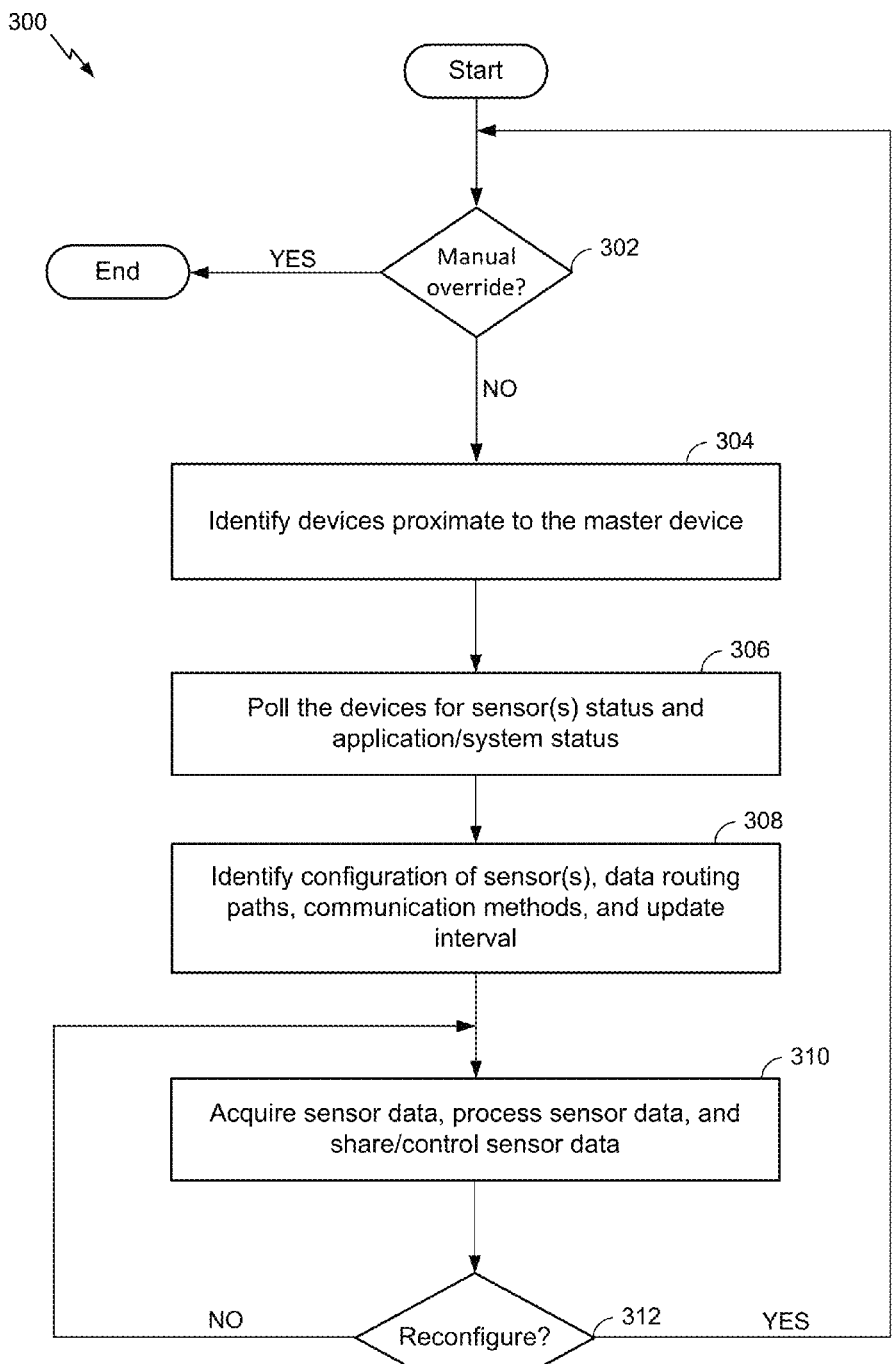
FIG. 3 is a flowchart 300 illustrating an exemplary method for sensor subsystem optimization, according to some implementations.

FIG. 3 is a flowchart 300 illustrating an exemplary method for sensor subsystem optimization, according to some implementations. In block 302, the method determines whether the user has initiated a manual override. If the user has issued a manual override, the method does not continue and manual control of the sensor configuration is given to the user. In block 304, devices proximate to the master device are identified. Identification of the devices could be based on GPS coordinates of the devices to determine which devices are proximate to each other. Identification of the devices could also be based on camera images obtained by one of the devices and used to identify devices within the field of view of the camera images. Similarly, identification of the devices could also be based on audio signals obtained by a microphone(s) on the devices and used to identify devices based on which devices hear the same audio signal. It can be appreciated that many other means of identification may also be employed. The identification step in block 302 can be implemented via an application executing on each of the devices or via a standardized protocol.

In block 306, the identified devices are polled for their sensor status and application/system status. The master device may poll the devices. The sensor status may provide the master device with information about which sensors on the polled device are currently active and their capabilities. Further, the application status may provide the master device with information about which applications on the polled device are currently using or could potentially use at some point any of the sensors on the device. For example, a GPS sensor on a polled device may be enabled but none of the location-based applications on that device may be using the GPS sensor. This information may be populated in the device-application sensor-mapping database 178 (FIG. 1).

In block 308, configuration of sensor(s), data routing paths, communication methods, and update intervals are identified from the identified devices. The accuracy of the sensor(s) on the identified devices may also be determined. This information may be used to configure the sensors. For example, sensors using the lowest power may be used with applications while sensors with higher power usage may be turned off. The master device may send communications to the identified devices with instructions regarding the sensor configuration. The communication may include power state for the sensors, data frequency, data interval, data format, etc. The sensor configuration database 176 (FIG. 1) may be populated with the identified sensor configurations, data routing paths, communication methods, and update intervals.

In block 310, after configuring the sensors on the identified devices, sensor data is acquired from the active sensors on the devices by all the other devices in the proximity of the master device, which may also include the master device itself. The sensor data may be shared across all the devices. Additionally, the sensor data may be processed by a particular device using the sensor data together with a particular application. The sensor data may also be controlled by one or more of the devices.

In block 312, the method determines whether a need exists to reconfigure the sensor configuration. If a need does exist, the method begins again at block 302, otherwise the method continues to acquire, process, and control the sensor data in block 310. The sensor data may need to be reconfigured based on various criteria. For example, if a particular device is low on battery life and a sensor on that device is being used, that sensor may be turned off and another redundant sensor on another device may be enabled so that the application using that sensor can continue running.

Figure 4:
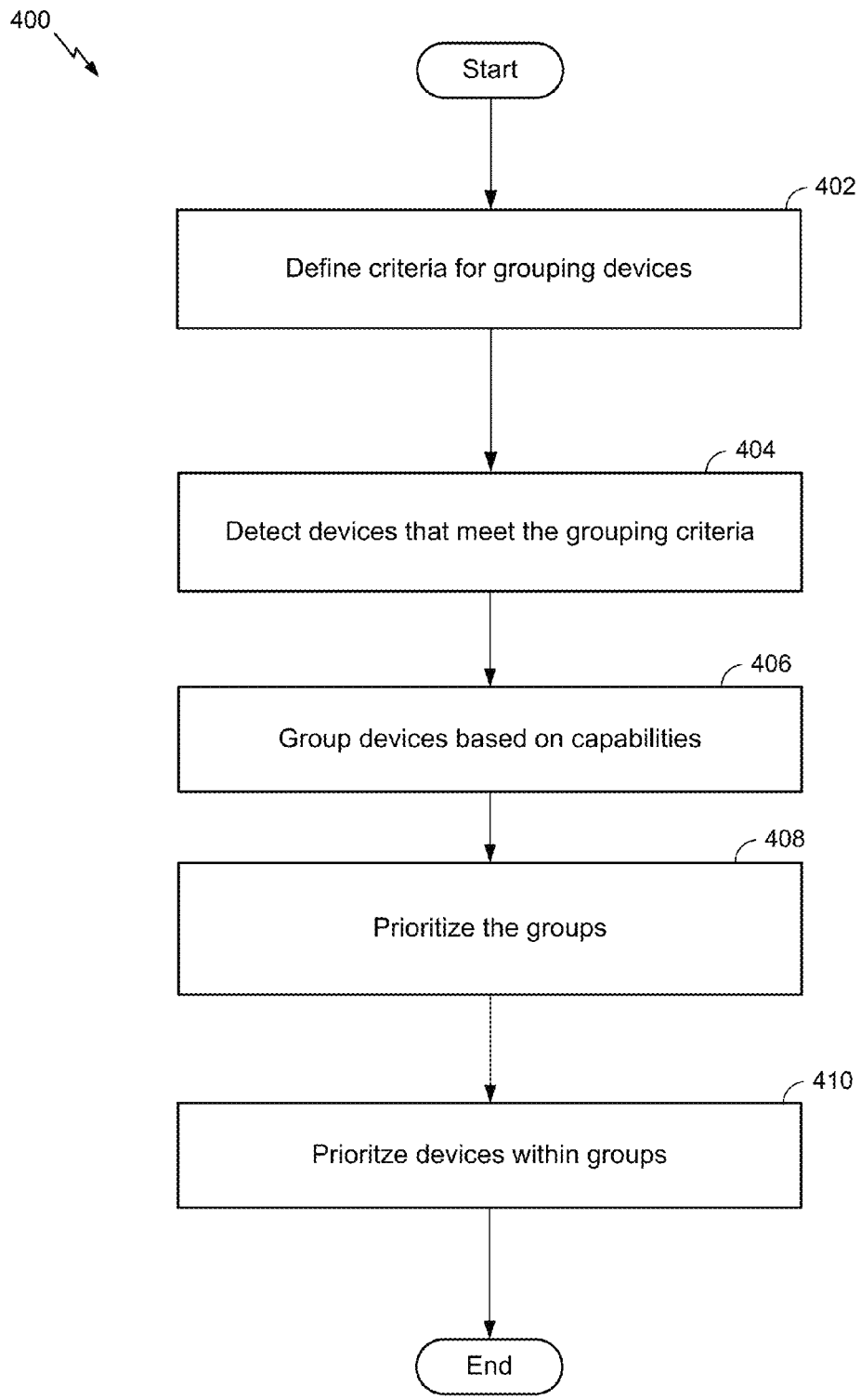
FIG. 4 is a flowchart 400 illustrating an exemplary method for grouping sensor-equipped devices, according to some implementations.

FIG. 4 is a flowchart 400 illustrating an exemplary method for grouping sensor-equipped devices, according to some implementations. The method illustrated in flowchart 400 illustrates further details of block 304 in of FIG. 3. In block 402, one or more criteria are defined for grouping devices together. The criteria could be based on a distance between the various devices. Another criteria could be based on cost of using a sensor within a device. That is, what type of data has to be sent and what medium the data may be sent over. Yet another type of criteria may be device ability, or ability of the sensors within the device. For example, some sensors may be able to provide more accurate data than others. Another type of criteria could also be based on grouping permissions.

In block 404, devices that meet the grouping criteria are detected. The detection of the devices meeting the grouping criteria may be performed by the master device via a communication protocol. These devices could include a camera, GPS, phone, tablet, TV, car, etc.

In block 406, the devices may be grouped based on the grouping criteria defined above. For example, devices may be grouped based on battery life, sensor type, sensor accuracy, available sensors, compute capacity, etc.

In block 408, the groups may be prioritized. The priority of groups may be predefined or determined on the fly based on a context of the devices. For example, if battery life is an important factor, a group with devices having higher battery life may be given higher priority. In some implementations, groups with a higher priority may have an increased chance of acting as the master device. Typically, higher priority groups may have increased sensor capabilities.

In block 410, the individual devices within the groups may be prioritized. In some implementations, the device capability & priority database 172 (FIG. 1) may be accessed to determine the priority of the individual devices. Selection of the device priority may be based on similar criteria for the device grouping, e.g., battery life, sensor type, sensor accuracy, device processing power, etc. In some implementations, the device having the highest priority may be defined as the master device.

Figure 5:
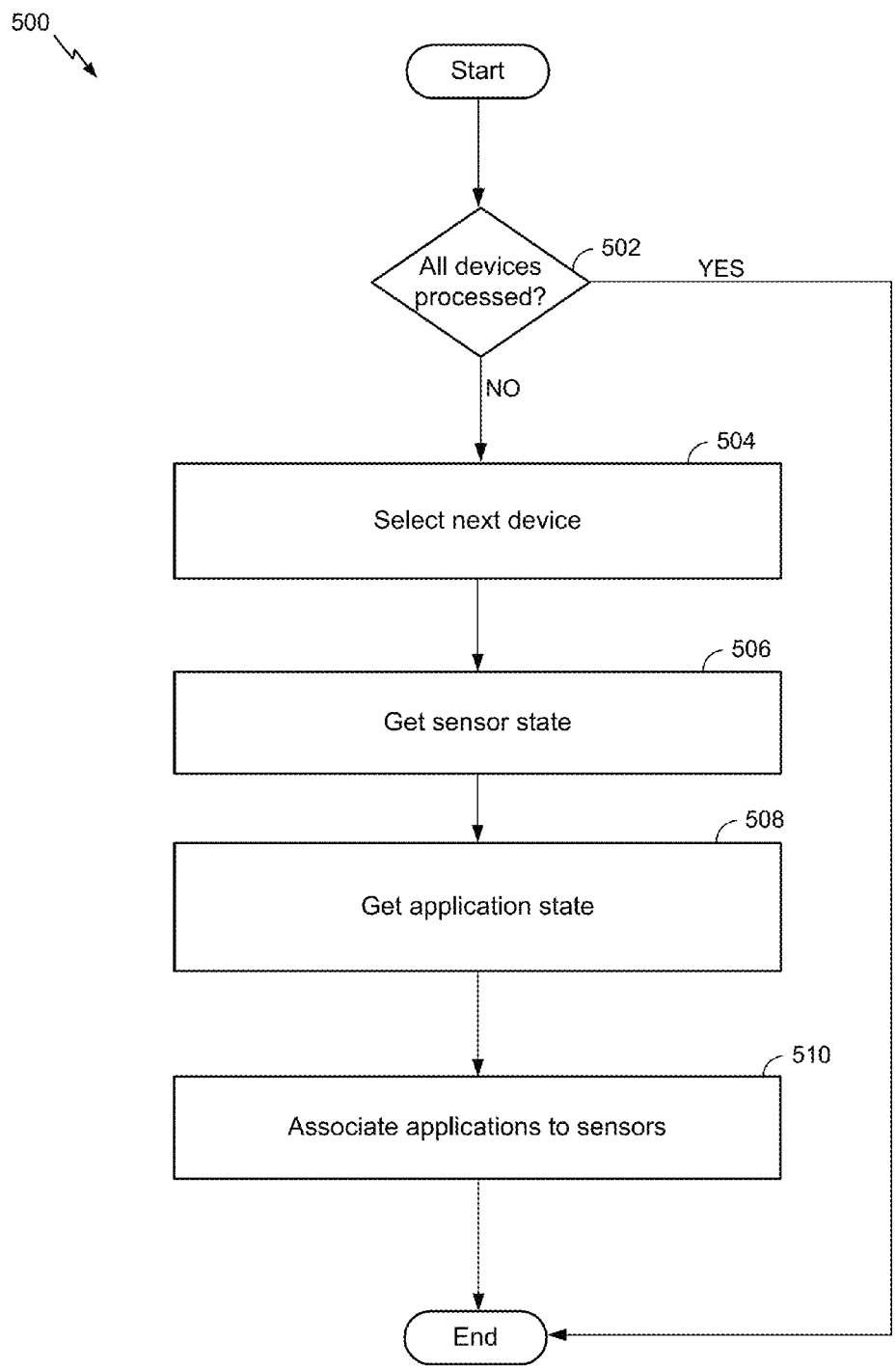
FIG. 5 is a flowchart 500 illustrating an exemplary method for device-application state mapping, according to some implementations.

FIG. 5 is a flowchart 500 illustrating an exemplary method for device-application state mapping, according to some implementations. The method illustrated in flowchart 500 illustrates further details of block 306 in of FIG. 3. In block 502, a determination is made whether all identified devices have been processed. If all identified devices have been processed, the method ends. Otherwise, if all devices have not been processed, the method continues at block 504. In block 504, the next device from a group of devices is selected. In block 506, a sensor state of the various sensors within the selected device is obtained. The senor state could include whether the sensors are on or off, current operating mode of the sensors, type of sensor positioning, etc.

In block 508, the application of the various sensors within the selected device is obtained. The application state may include what types of applications are running and what types of sensor data these applications are using. For example, a location-based navigation application could be determined to be using a GPS sensor. Further information about the application states can be obtained such as whether the application is currently running or is running in the background of the operating system of the device.

In block 510, the applications may be associated to the sensors. At this point, information about each application is known and it can be determined which sensors, across the various devices, need to be active in order to facilitate execution of the applications. This information may be populated in the device-application sensor-mapping database 178. For example, if one of the devices is determined to have a video application running, at least one camera will need to be active across the various identified devices.

Figure 6:
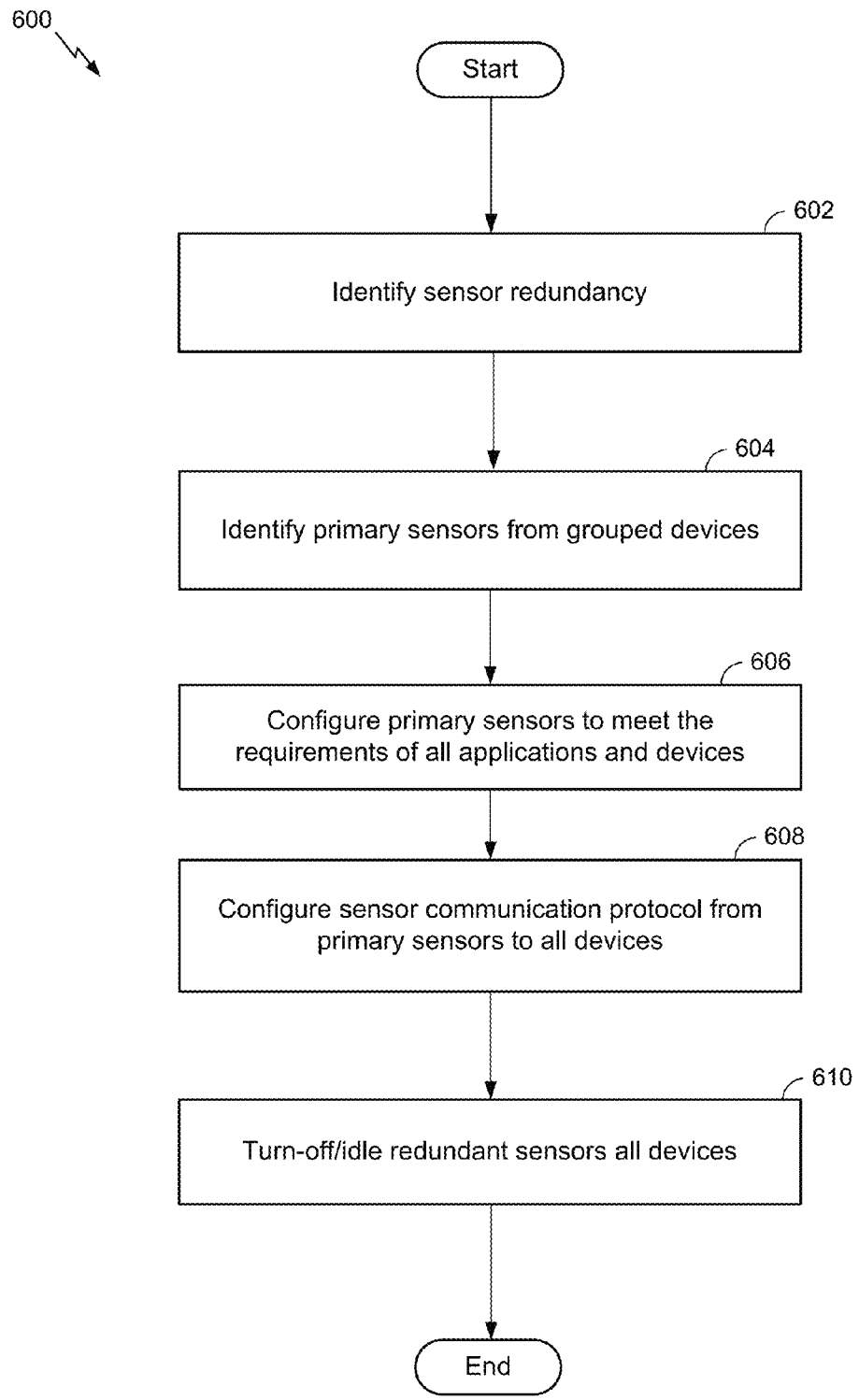
FIG. 6 is a flowchart 600 illustrating an exemplary method for device-application state mapping, according to some implementations.

FIG. 6 is a flowchart 600 illustrating an exemplary method for device-application state mapping, according to some implementations. The method illustrated in flowchart 600 illustrates further details of block 308 in of FIG. 3. In block 602, sensor redundancy is identified. The identification may determine whether more than one of a particular type of sensor exists across the various devices. For example, if three GPS sensors exist across the identified device, they may be identified as redundant because typically only one may be required by a particular application.

In block 604, the primary sensors are identified from grouped devices. At this point, it is known which sensors are required by applications executing across the devices. As such, primary sensors from the group of devices may be identified to provide the best quality of service. For example, if a location-based application is running on one of the devices, a GPS sensor having the highest accuracy may be chosen from amongst the grouped devices. However, if quality of service is attributed to longer battery life, a GPS sensor using the least amount of power ma be chosen from amongst the grouped devices.

In block 606, the primary sensors are configured to meet the requirements of all applications and devices. That is, the update interval, data routing paths, etc. may be configured on the primary sensors to satisfy the data requirements by the application. For example, if a location-based application requires GPS data every 0.5 seconds, the primary GPS sensor may be configured to provide data every 0.5 seconds.

In block 608, the sensor communication protocol from the primary sensors to all devices is configured. Data from one device housing a primary sensor may need to be shared with other devices within proximity. As such, the communication protocol needs to be configured. For example, all devices and the primary sensor(s) may be configured to use Bluetooth. Cost of the communication protocol may also be taken into account. For example, if 4G data rates are more expensive than 3G data rates, 3G may be selected as the communication protocol. The communication channels may also be optimized. For example, certain unused communication modules may be turned off. For example, if Bluetooth is being used, and no other applications require Wi-Fi, the Wi-Fi module may be turned off on the devices. It can be appreciated that a communication channel may be chosen that all devices can understand.

In block 610, redundant sensors are turned off, placed into idle state, placed into sleep mode, etc. By turning off the redundant sensors, battery life on the devices may be improved along with processing power. As such, quality of service across all the devices may be improved.

Figure 7:
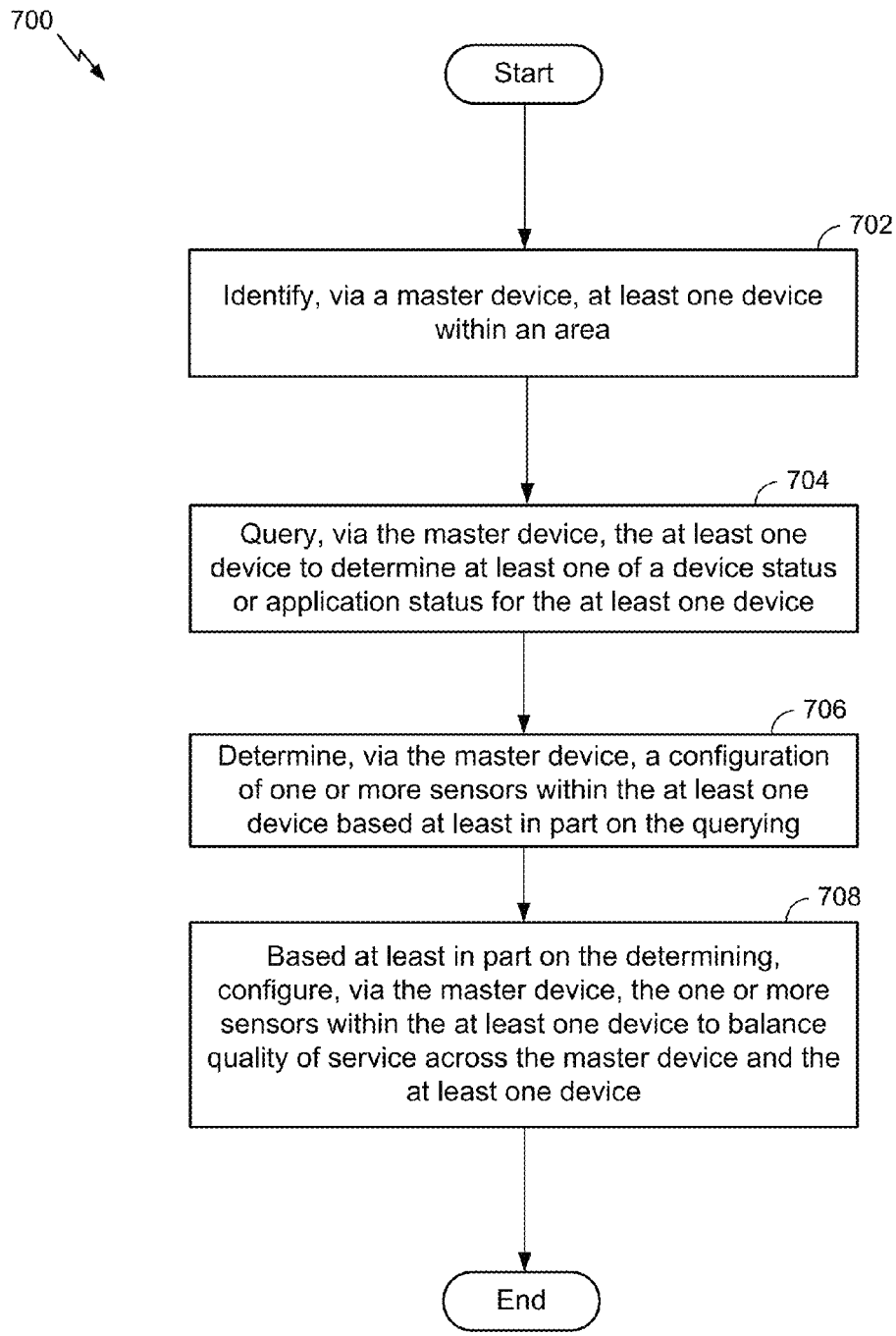
FIG. 7 is a flowchart 700 illustrating an exemplary method for reducing sensor redundancy in sensor-equipped devices, according to some implementations.

FIG. 7 is a flowchart 700 illustrating an exemplary method for reducing sensor redundancy in sensor-equipped devices, according to some implementations. In block 702, at least one device within an area is identified via a master device. The device may include a smartphone, a tablet computer, a smart shoe, a smart watch, a television, a personal computer, a smart glass, etc. The area may be defined by a predetermined value, a dynamic value, or a determined context associated with the at least one device. For example, in FIG. 2, the vehicle may identify the smart watch, tablet computer, and smartphone.

In block 704, at least one device is queried to determine at least one of a device status or application status for the at least one device. For example, in FIG. 2, the vehicle may query the smart watch, tablet computer, and smartphone to determine the status of each device's sensors and status of applications running on the devices.

In block 706, a configuration of one or more sensors within the at least one device based at least in part on the querying is determined. The determining could include determining a sensor implementation mapping of the at least one device. For example, in FIG. 2, the vehicle may determine the configuration of sensors between the smart watch, tablet computer, and smartphone.

In block 708, based at least in part on the determining, the one or more sensors within the at least one device are configured to balance quality of service across the master device and the at least one device. Configuring the one or more sensors may include switching a power state of the one or more sensors or configuring one or more data processing attributes of the one or more sensor. The one or more data processing attributes may include a data path, data accuracy, data format, or data interval. The configuring of the sensors may be performed upon a predetermined interval or a predefined condition. For example, in FIG. 2, the vehicle may configure the sensors between the smart watch, tablet computer, and smartphone.

In some implementations, the data from the one or more sensors can be time-synchronized between the at least one device and the master device.

Exemplary Computing System

Figure 8:
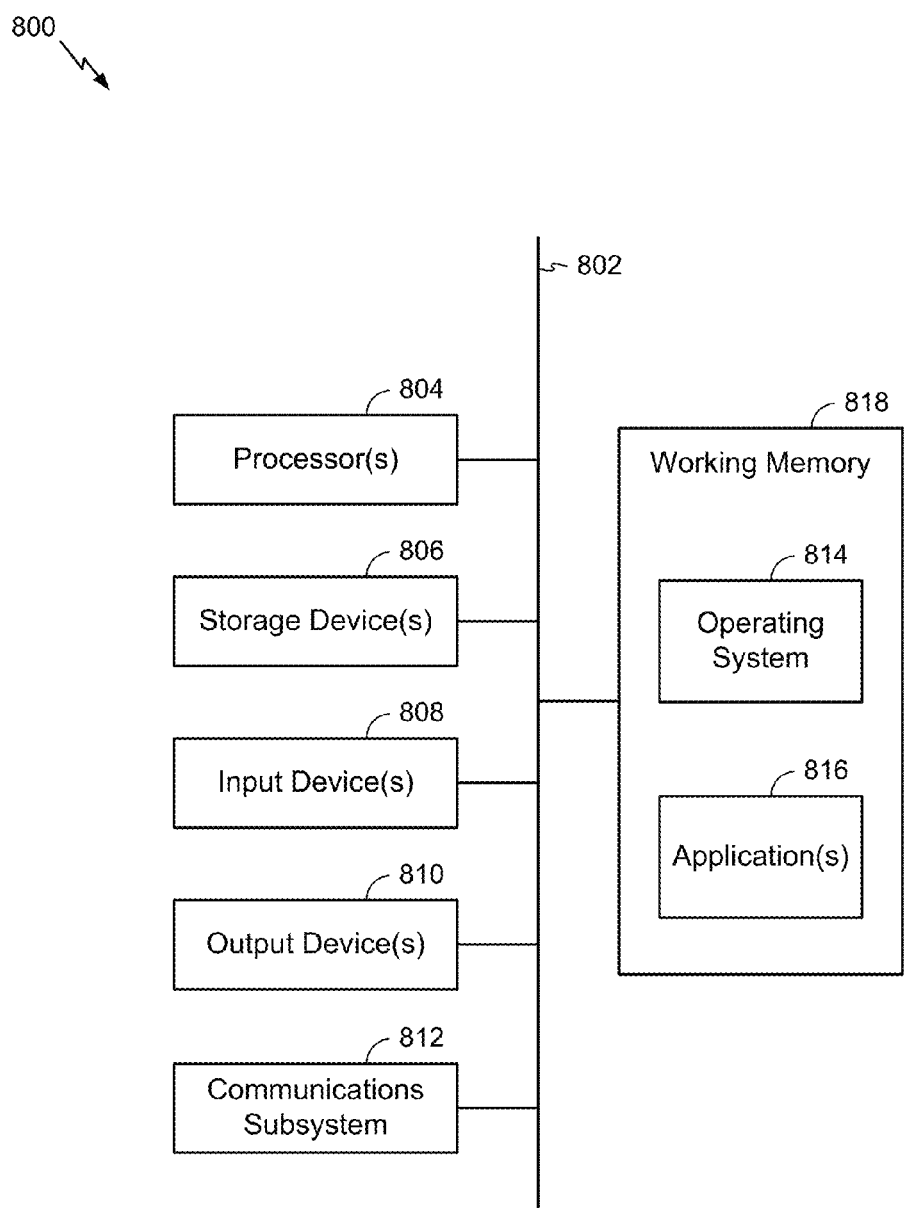
FIG. 8 illustrates an example of a computing system in which one or more implementations may be implemented.

Having described multiple aspects of improving assistance data parameters in floor plan maps for indoor positioning, an example of a computing system in which various aspects of the disclosure may be implemented will now be described with respect to FIG. 8. According to one or more aspects, a computer system as illustrated in FIG. 8 may be incorporated as part of a computing device, which may implement, perform, and/or execute any and/or all of the features, methods, and/or method steps described herein. For example, computer system 800 may represent some of the components of a hand-held device. A hand-held device may be any computing device with an input sensory unit, such as a wireless receiver or modem. Examples of a hand-held device include but are not limited to video game consoles, tablets, smart phones, televisions, and mobile devices or mobile stations. In some implementations, the computer system 800 is configured to implement any of the methods described above. FIG. 8 provides a schematic illustration of one implementation of a computer system 800 that can perform the methods provided by various other implementations, as described herein, and/or can function as the host computer system, a remote kiosk/terminal, a point-of-sale device, a mobile device, a set-top box, and/or a computer system. FIG. 8 is meant only to provide a generalized illustration of various components, any and/or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 802 (or may otherwise be in communication, as appropriate). The hardware elements may include one or more processors 804, including without limitation one or more general-purpose processors and/or one or more special-purpose processors (such as digital signal processing chips, graphics acceleration processors, and/or the like); one or more input devices 808, which can include without limitation a camera, wireless receivers, wireless sensors, a mouse, a keyboard and/or the like; and one or more output devices 810, which can include without limitation a display unit, a printer and/or the like. In some implementations, the one or more processors 804 may be configured to perform a subset or all of the functions described above with respect to FIG. 1. The processor 804 may comprise a general processor and/or and application processor, for example. In some implementations, the processor is integrated into an element that processes visual tracking device inputs and wireless sensor inputs.

The computer system 800 may further include (and/or be in communication with) one or more non-transitory storage devices 806, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 800 might also include a communications subsystem 812, which can include without limitation a modem, a network card (wireless or wired), an infrared communication device, a wireless communication device and/or chipset (such as a Bluetooth® device, an 802.11 device, a WiFi device, a WiMax device, cellular communication facilities, etc.), and/or the like. The communications subsystem 812 may permit data to be exchanged with a network (such as the network described below, to name one example), other computer systems, and/or any other devices described herein. In many implementations, the computer system 800 will further comprise a non-transitory working memory 818, which can include a RAM or ROM device, as described above. In some implementations, communications subsystem 812 may interface with transceiver(s) configured to transmit and receive signals from access points or mobile devices. Some implementations may include a separate receiver or receivers, and a separate transmitter or transmitters.

The computer system 800 also can comprise software elements, shown as being currently located within the working memory 818, including an operating system 814, device drivers, executable libraries, and/or other code, such as one or more application programs 816, which may comprise computer programs provided by various implementations, and/or may be designed to implement methods, and/or configure systems, provided by other implementations, as described herein. Merely by way of example, one or more procedures described with respect to the method(s) discussed above, for example as described with respect to FIG. 8, might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 806 described above. In some cases, the storage medium might be incorporated within a computer system, such as computer system 800. In other implementations, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some implementations may employ a computer system (such as the computer system 800) to perform methods in accordance with the disclosure. For example, some or all of the procedures of the described methods may be performed by the computer system 800 in response to processor 804 executing one or more sequences of one or more instructions (which might be incorporated into the operating system 814 and/or other code, such as an application program 816) contained in the working memory 818. Such instructions may be read into the working memory 818 from another computer-readable medium, such as one or more of the storage device(s) 806. Merely by way of example, execution of the sequences of instructions contained in the working memory 818 might cause the processor(s) 804 to perform one or more procedures of the methods described herein, for example methods described with respect to FIGS. 3-7.

The terms "machine-readable medium" and "computer-readable medium," as used herein, refer to any medium that participates in providing data that causes a machine to operate in a specific fashion. In an implementation implemented using the computer system 800, various computer-readable media might be involved in providing instructions/code to processor(s) 804 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 806. Volatile media include, without limitation, dynamic memory, such as the working memory 818. Transmission media include, without limitation, coaxial cables, copper wire and fiber optics, including the wires that comprise the bus 802, as well as the various components of the communications subsystem 812 (and/or the media by which the communications subsystem 812 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 802 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800. These signals, which might be in the form of electromagnetic signals, acoustic signals, optical signals and/or the like, are all examples of carrier waves on which instructions can be encoded, in accordance with various implementations.

The communications subsystem 812 (and/or components thereof) generally will receive the signals, and the bus 802 then might carry the signals (and/or the data, instructions, etc. carried by the signals) to the working memory 818, from which the processor(s) 804 retrieves and executes the instructions. The instructions received by the working memory 818 may optionally be stored on a non-transitory storage device 806 either before or after execution by the processor(s) 804. Memory 818 may contain at least one database according to any of the databases and methods described herein. Memory 818 may thus store any of the values discussed in any of the present disclosures, including FIGS. 1-8 and related descriptions.

The methods described in FIGS. 3-7 may be implemented by various blocks in FIG. 8. For example, processor 804 may be configured to perform any of the functions of blocks in flowcharts 300, 400, 500, 600, or 700. Storage device 806 may be configured to store an intermediate result, such as a globally unique attribute or locally unique attribute discussed within any of blocks mentioned herein. Storage device 806 may also contain a database consistent with any of the present disclosures. The memory 818 may similarly be configured to record signals, representation of signals, or database values necessary to perform any of the functions described in any of the blocks mentioned herein. Results that may need to be stored in a temporary or volatile memory, such as RAM, may also be included in memory 818, and may include any intermediate result similar to what may be stored in storage device 806. Input device 808 may be configured to receive wireless signals from satellites and/or base stations according to the present disclosures described herein. Output device 810 may be configured to display images, print text, transmit signals and/or output other data according to any of the present disclosures.

The methods, systems, and devices discussed above are examples. Various implementations may omit, substitute, or add various procedures or components as appropriate. For instance, in alternative configurations, the methods described may be performed in an order different from that described, and/or various stages may be added, omitted, and/or combined. Also, features described with respect to certain implementations may be combined in various other implementations. Different aspects and elements of the implementations may be combined in a similar manner. Also, technology evolves and, thus, many of the elements are examples that do not limit the scope of the disclosure to those specific examples.

Specific details are given in the description to provide a thorough understanding of the implementations. However, implementations may be practiced without these specific details. For example, well-known circuits, processes, algorithms, structures, and techniques have been shown without unnecessary detail in order to avoid obscuring the implementations. This description provides example implementations only, and is not intended to limit the scope, applicability, or configuration of the implementations described herein. Rather, the preceding description of the implementations will provide those skilled in the art with an enabling description for implementing implementations described herein. Various changes may be made in the function and arrangement of elements without departing from the spirit and scope of the implementations described herein.

Also, some implementations were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, implementations of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several implementations, various modifications, alternative constructions, and equivalents may be used without departing from the spirit of the disclosure. For example, the above elements may merely be a component of a larger system, wherein other rules may take precedence over or otherwise modify the application of the implementations described herein. Also, a number of steps may be undertaken before, during, or after the above elements are considered. Accordingly, the above description does not limit the scope of the disclosure.

The techniques described herein may be used for mobile device or client access to various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95, IS-856 and High Rate Packet Data (HRPD) standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA is part of Universal Mobile Telecommunication System (UMTS). Long Term Evolution (LTE) is a radio access technology used by E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). IEEE 802.11 networks are also known as WiFi networks or wireless local area networks (WLANs) and are defined in a family of standards from the Institute of Electrical and Electronics Engineers (IEEE). These various radio technologies and standards are known in the art.

Various examples have been described. These and other examples are within the scope of the following claims.

What is claimed is:

1. A method for reducing sensor redundancy in sensor-equipped devices, the method comprising:
   identifying, via a master device, at least one device within an area;
   querying, via the master device, the at least one device to determine at least one of a device status or application status for the at least one device;
   determining, via the master device, a configuration of one or more sensors within the at least one device based at least in part on the querying; and
   based at least in part on the determining, configuring, via the master device, the one or more sensors within the at least one device to balance quality of service across the master device and the at least one device.

2. The method of claim 1 wherein the at least one device comprises at least one of a smartphone, a tablet computer, a smart shoe, a smart watch, television, personal computer, or a smart glass.

3. The method of claim 1 wherein configuring the one or more sensors comprises switching a power state of the one or more sensors within the at least one device.

4. The method of claim 1 wherein configuring the one or more sensors comprises configuring one or more data processing attributes of the one or more sensors.

5. The method of claim 4 wherein the one or more data processing attributes comprises at least one of datapath, data accuracy, data format, or data interval.

6. The method of claim 1 wherein the area may be determined by at least one of a predetermined value, a dynamic value, or a determined context associated with the at least one device.

7. The method of claim 1 wherein the determining comprises determining a sensor implementation mapping of the at least one device.

8. The method of claim 1 further comprising time-synchronizing, via the master device, data from the one or more sensors within the at least one device with data from one or more sensors within the master device.

9. The method of claim 1 wherein the configuring is performed upon a predetermined interval or upon a predefined condition.

10. The method of claim 1 further comprising:
receiving, at the master device, a location request;
polling, via the master device, the or more sensors within the at least one device;
in response to the polling, receiving, from the at least one device, a location of the at least one device; and
responding, via the master device, to the location request with the location of the at least one device.

11. An apparatus for reducing sensor redundancy in sensor-equipped devices, the apparatus comprising:
a transceiver configured to send and receive a communication;
memory;
a processor coupled to the transceiver and the memory;
the processor configured to:
identify at least one device within an area;
query, via the transceiver, the at least one device to determine at least one of a device status or application status for the at least one device;
determine a configuration of one or more sensors within the at least one device based at least in part on the querying; and
based at least in part on the determining, configure the one or more sensors within the at least one device to balance quality of service across the apparatus and the at least one device.

12. The apparatus of claim 11 wherein the at least one device comprises at least one of a smartphone, a tablet computer, a smart shoe, a smart watch, television, personal computer, or a smart glass.

13. The apparatus of claim 11 wherein configuring the one or more sensors comprises switching a power state of the one or more sensors within the at least one device.

14. The apparatus of claim 11 wherein configuring the one or more sensors comprises configuring one or more data processing attributes of the one or more sensors.

15. The apparatus of claim 14 wherein the one or more data processing attributes comprises at least one of datapath, data accuracy, data format, or data interval.

16. The apparatus of claim 11 wherein the area may be determined by at least one of a predetermined value, a dynamic value, or a determined context associated with the at least one device.

17. The apparatus of claim 11 wherein the determining comprises determining a sensor implementation mapping of the at least one device.

18. The apparatus of claim 11 wherein the processor is further configured to time-synchronize data from the one or more sensors within the at least one device with data from one or more sensors within the apparatus.

19. The apparatus of claim 11 wherein the configuring is performed upon a predetermined interval or upon a pre-defined condition.

20. The apparatus of claim 11 wherein the processor is further configured to:
receive a location request;
poll, via the transceiver, the or more sensors within the at least one device;
in response to the polling, receive via the transceiver, from the at least one device, a location of the at least one device; and
respond to the location request with the location of the at least one device.

21. An apparatus for reducing sensor redundancy in sensor-equipped devices, the apparatus comprising:
means for identifying, via a master device, at least one device within an area;
means for querying, via the master device, the at least one device to determine at least one of a device status or application status for the at least one device;
means for determining, via the master device, a configuration of one or more sensors within the at least one device based at least in part on the querying; and
based at least in part on the determining, means for configuring, via the master device, the one or more sensors within the at least one device to balance quality of service across the master device and the at least one device.

22. The apparatus of claim 21 wherein the means for configuring the one or more sensors comprises means for switching a power state of the one or more sensors within the at least one device.

23. The apparatus of claim 21 wherein the means for configuring the one or more sensors comprises means for configuring one or more data processing attributes of the one or more sensors.

24. The apparatus of claim 21 wherein the means for determining comprises means for determining a sensor implementation mapping of the at least one device.

25. The apparatus of claim 21 further comprising means for time-synchronizing, via the master device, data from the one or more sensors within the at least one device with data from one or more sensors within the master device.

26. A non-transitory processor-readable medium comprising processor readable instructions configured to cause a processor to:
identify at least one device within an area;
query the at least one device to determine at least one of a device status or application status for the at least one device;
determine a configuration of one or more sensors within the at least one device based at least in part on the querying; and
based at least in part on the determining, configure the one or more sensors within the at least one device to balance quality of service across a master device and the at least one device.

27. The non-transitory processor-readable medium of claim 26 wherein configuring the one or more sensors comprises switching a power state of the one or more sensors within the at least one device.

28. The non-transitory processor-readable medium of claim 26 wherein configuring the one or more sensors comprises configuring one or more data processing attributes of the one or more sensors.

29. The non-transitory processor-readable medium of claim 26 wherein the determining comprises determining a sensor implementation mapping of the at least one device.

30. The non-transitory processor-readable medium of claim 26 wherein the processor readable instructions are further configured to cause the processor to time-synchronize, via the master device, data from the one or more sensors within the at least one device with data from one or more sensors within the master device.

* * * * *